United States Patent [19]
Mentzer

[11] 3,784,719
[45] Jan. 8, 1974

[54] BRIDGE BIDDING INDICATOR
[76] Inventor: James A. Mentzer, 3821 Bassett Creek Dr., Minneapolis, Minn.
[22] Filed: Aug. 10, 1972
[21] Appl. No.: 279,678

[52] U.S. Cl. ............ 35/8 B, 35/9 R, 209/110, 209/111.8
[51] Int. Cl. .............................. G09b 19/22
[58] Field of Search .............. 35/8 B, 9 R, 9 C; 209/111.8, 110, 110.5

[56] References Cited
UNITED STATES PATENTS

| | | | |
|---|---|---|---|
| 2,004,513 | 6/1935 | Watkins | 273/148 |
| 2,690,751 | 10/1954 | Feiertag | 209/110.5 X |
| 3,013,349 | 12/1961 | Cooper | 35/8 B X |
| 3,185,481 | 5/1965 | Watkins | 273/148 |
| 3,377,069 | 4/1968 | Nottoli | 273/149 |
| 3,400,721 | 9/1968 | Zenzefilis | 209/110 |
| 3,548,517 | 12/1970 | Penraat et al. | 35/9 R |
| 2,269,767 | 1/1942 | Jayne | 209/111.8 |
| 2,577,460 | 12/1951 | Gottschalk | 209/111.8 X |
| 3,233,340 | 2/1966 | Brown | 35/9 C |

Primary Examiner—Wm. H. Grieb
Attorney—Merchant, Gould, Smith & Edell

[57] ABSTRACT

A bridge bidding indicator having a plurality of magnetically attractable instruction cards each of which includes an apertured information field representative of a bridge hand of particular evaluation, and a bidding instruction corresponding to such evaluation. The instruction card deck is placed in a box housing having a hinged closure member, and pegs are selectively inserted through one face of the housing into the apertured information fields to represent a particular hand evaluation and to retain all but the appropriate instruction card. The chosen card is removed from the deck by opening the closure member, a portion of which is magnetized and engages the deck when closed.

8 Claims, 8 Drawing Figures

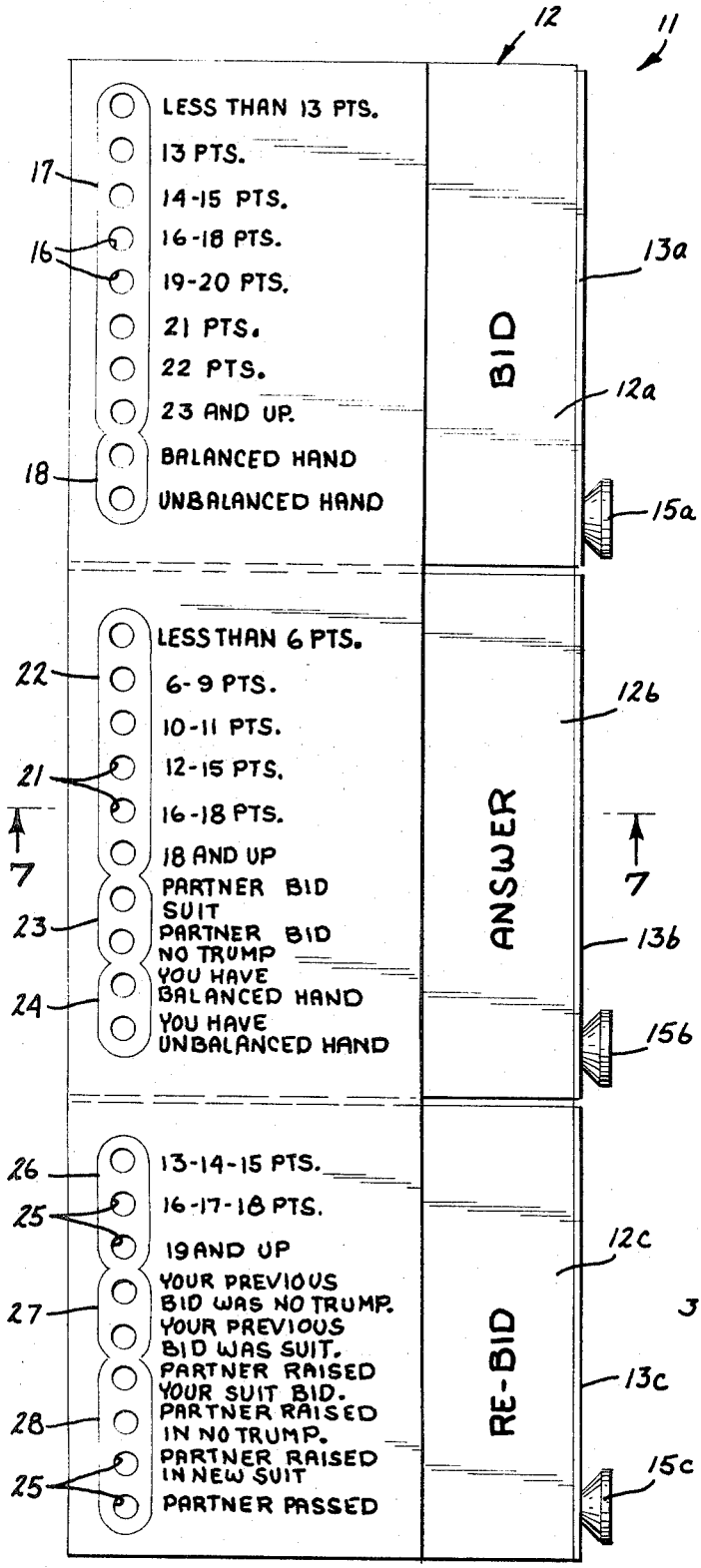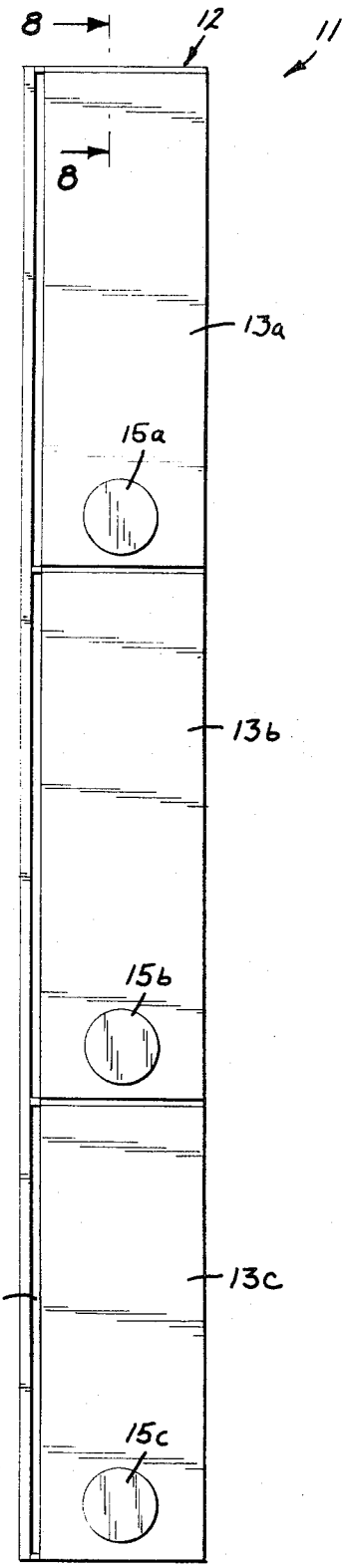

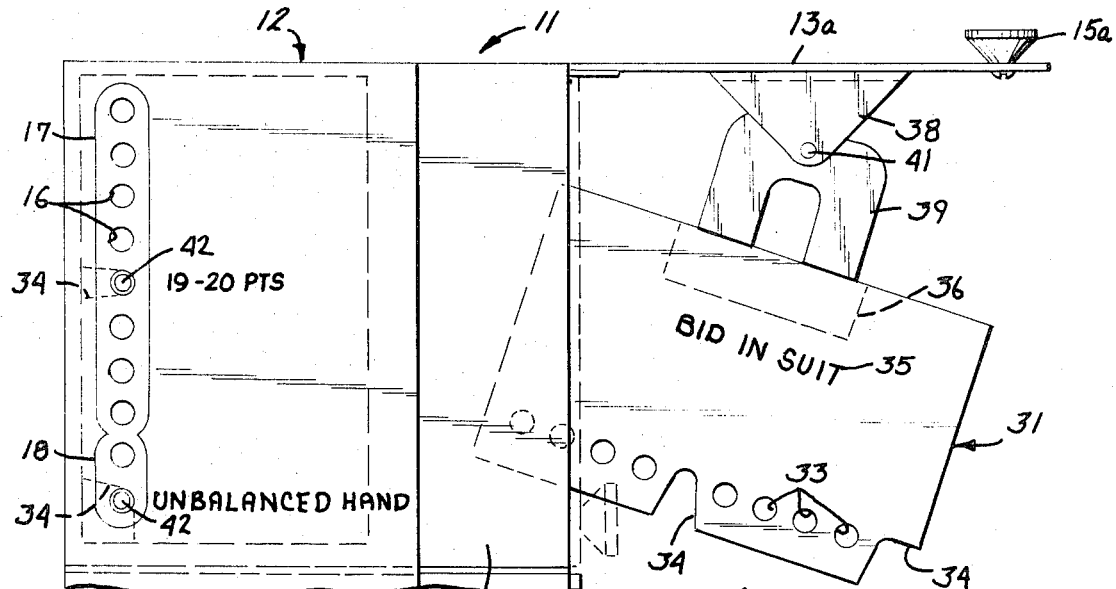
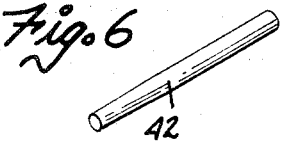
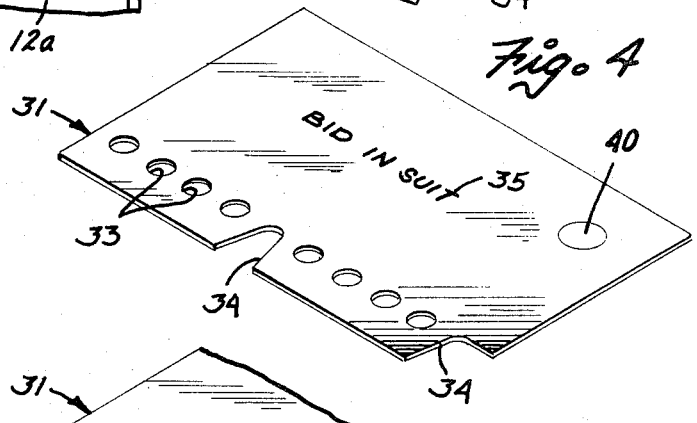
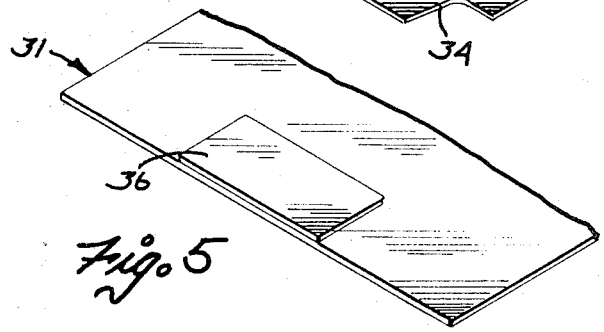
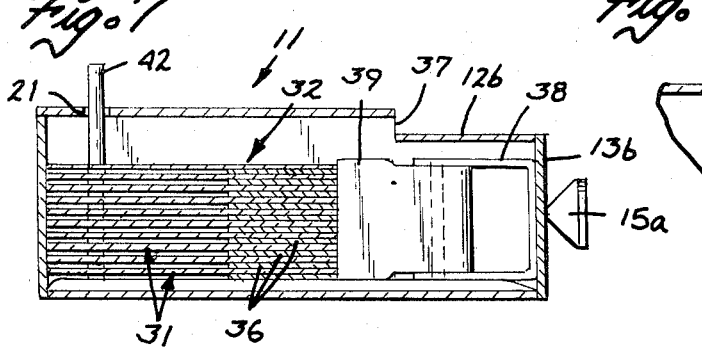
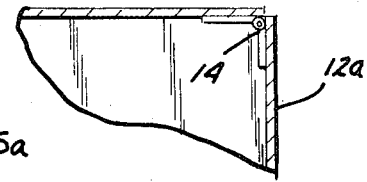

BRIDGE BIDDING INDICATOR

The invention is directed to a bridge bidding indicator which provides an appropriate bidding instruction in response to an input representative of a particular bridge hand.

The successful bidding of bridge hands is extremely difficult for beginning bridge players to learn and master, and continues to represent a problem to even experienced players. This is particularly true of the point count system of evaluating bridge hands, which require calculating the total points in the hand and making any of a number of possible bids in accordance with the specific point total or a given point range. Another factor that is ordinarily considered in addition to the point total is whether the hand is balanced or unbalanced; i.e., whether certain suits are much stronger than others. The problem of what to bid is further complicated by the stage at which the bid must be made, since successful communication between bridge partners must be based on the bid or bids already made. Thus, where the opening bid relies only upon the point total and whether the hand is balanced or not, the answering bid must not only take this information into consideration but also the partner's bid strength and suit. Beyond the answering bid, the rebid, if necessary, must take into consideration the point count, the bidder's previous bid and the partner's previous bid.

Because of the complexities and difficulties encountered in successful bridge bidding, I have devised a bridge bidding indicator which requires the player to evaluate his hand by the point count system, to enter an input representative of the hand evaluation and to receive an output giving an appropriate bid instruction. The bidding indicator consists of a box-like housing divided into a "bid" section, an "answer" section and a "rebid" section. Each section has its own deck of instruction cards which are magnetically attractable and can be removed from the section by opening a magnetized closure member. Each card has an apertured information field, portions of which are slotted to represent a particular point evaluation, and a complete bidding instruction corresponding to such evaulation. With the deck of instruction cards placed in the housing, two or more pegs are selectively inserted through appropriate openings in the housing which are in registration with the apertured card information fields. A unique position of the pegs representing a specific hand evaluation retains all instruction cards but the one corresponding to that evaluation (which is slotted appropriately), and opening of the closure member effects removal of the unretained card with the proper instruction.

The bridge bidding indicator is particularly advantageous to the beginner because it is self-explanatory and requires no learning for its operation other than how to properly evaluate the bridge hand. An additional feature arises from the use of individual cards, since this provides sufficient space for a complete bridge bidding instruction without the guess work so often involved with conventional indicators. Further, by requiring the user to thoroughly evaluate his own hand, the bidding instructions appear more logical and the entire bidding procedure is learned more easily and rapidly.

BRIEF DESCRIPTION OF THE DRAWINGS

FIG. 1 is a view in top plan of a bridge bidding indicator embodying the inventive principle;

FIG. 2 is a view in side elevation of the bridge bidding indicator;

FIG. 3 is a fragmentary view of one section of the bridge bidding indicator shown in two positions of operation;

FIG. 4 is a perspective view of the top face of a bidding instruction card;

FIG. 5 is a perspective view of the bottom side of an instruction card;

FIG. 6 is a perspective view of a peg used in selection of a particular bid instruction card;

FIG. 7 is a sectional view taken along the line 7—7 of FIG. 1; and

FIG. 8 is a fragmentary sectional view taken along the line 8—8 of FIG. 2.

DESCRIPTION OF THE PREFERRED EMBODIMENT

With initial reference to FIGS. 1 and 2, a bridge bidding indicator embodying the inventive principle is represented generally by the numeral 11. Bridge bidding indicator 11 comprises a box-like housing 12 which is generally rectangular in shape and is divided into three sections 12a–c. As shown by the legend in FIG. 1, section 12a is the "bid" section, section 12b is the "answer" section and section 12c is the "rebid" section.

With additional reference to FIGS. 3 and 8, each of the sections 12a–c has an open side which is closeable by an appropriately sized door, the doors being designated 13a–c, respectively. As shown in FIG. 8, each of the doors 13a–c is swingably mounted on a partition of the housing 12 by a hinge 14. The doors 13a–c also have handles 15a–c for swinging to the open position shown in FIG. 3.

With continued reference to FIG. 1, the "bid" section 12a has an information field formed in its top surface which comprises a plurality of apertures 16 with an appropriate legend for each. The information field is actually divided into subfields 17, 18, the former of which represents the actual point count of the bridge hand with the latter indicating whether the bridge hand is balanced or not.

"Answer" section 12b has a similar information field formed from a plurality of aligned apertures 21 each of which has an appropriate legend. This information field is also divided into subfields 22–24 each of which represents a different facet of bridge bidding information. Subfields 22 and 24 correspond to subfields 17 and 18 of "bid" section 12a, respectively representing point count and balance of the bridge hand. Subfield 23 includes two apertures 21 indicative of whether the bidder's partner may bid in a particular suit or a "no trump" bid.

"Rebid" section 12c has aligned apertures 25 defining three subfields 26–28. Subfield 26 again represents point count of the bridge hand, subfield 27 indicates whether the bidder's previous bid was a suit bid or "no trump", and subfield 28 represents four alternatives which the bidder's partner could have taken in his previous bid; i.e., whether the partner raised the bidder's suit bid, raised the bidder's no trump bid, raised the bid in a new suit or simply passed.

FIGS. 4 and 5 disclose a typical bidding instruction card 31 which forms part of a deck 32 (FIG. 7) and is sized and shaped to be received in each of the sections 12a–c. As shown in FIG. 4, the bidding instruction card 31 has a plurality of aligned apertures 33 defining its own information field, the apertures being spaced from the left edge of the card a sufficient distance to permit registration with the apertures 16, 21 and 25 of the sections 12a–c. Two of these apertures 33 are slotted or opened to the card edge, as designated by the numeral 34, to represent a bridge hand of a particular evaluation. A complete bridge bidding instruction 35 is placed on the top face of card 31 corresponding to the unique information represented by slotted apertures 34. As shown in FIG. 3, instruction card 31 is intended for use with section 12a, and each of the slotted apertures 34 falls within one of the sub-information fields 17, 18.

In the preferred embodiment, instruction cards 31 are formed from cardboard or the like, and each has a color-coded spot 40 corresponding to the proper section 12a–c in which it belongs. As shown in FIG. 5, a small metal plate 36 is affixed to the bottom side of each of the instruction cards, the plate 36 being disposed at the card edge furthest from the apertures 33. When arranged in deck fashion, the instruction cards 31 have all apertures 33 alignably disposed on one side and all metal plates 36 on the other, as shown in FIG. 7. The instruction cards 31 are inserted into the appropriate section 12a–c through the door opening, or through an elongated opening 37 (FIG. 7) formed in the top of the housing.

With reference to FIGS. 3 and 7, a U-shaped bracket 38 is centrally affixed on the inner face of each of the doors 13a–c. A permanent magnet 39 is disposed between the legs of the bracket 38 and pivotally secured thereto by a pin 41. As shown in FIG. 3, the width of magnet 39 is slightly less than the width of the metal plate 36; and, as shown in FIG. 7, its depth is chosen so that it engages each of the instruction cards 31 and metal plates 36 with the door 13 in a closed position.

FIG. 6 discloses a tapered peg 42 which is sized for projection through the apertures 16, 21 and 25 of the three information fields of sections 12a–c, and through the apertures 33 defining the information field of the instruction cards 31. As will be pointed out in further detail below, a peg 42 is required for each sub-information field to obtain an appropriate instruction card 31 for a bridge hand of particular evaluation.

In operation, the appropriate instruction cards 31 are initially placed in each of the sections 12a–c in deck fashion with the apertures of all information fields in registration. The doors 13a–c are then closed to permit the magnet 39 to engage and magnetically attract the metal plates 36.

At this time, assuming that an opening bid is appropriate, the user evaluates his bridge hand, calculating the point count in the conventional manner and determining whether his hand is balanced or unbalanced. In the example of FIG. 3, the user's hand is unbalanced and totals 19–20 points. Consequently, a peg 42 is entered into the appropriate aperture 16 in each of the subinformation fields 17, 18, projecting through the entire card deck 32 as shown in FIG. 7. The specific instruction card 31 shown in FIGS. 3 and 4 is unique with respect to the other cards in the deck, the uniqueness being determined by placement of the slotted apertures 34. Consequently, insertion of the pegs 42 into the subinformation field 17, 18 serves to retain each and every information card in the deck with the exception of the card 31 having a slotted aperture 34 as shown. Thus, with the pegs 42 properly placed, the user opens the door 13a, and the magnet 39 draws the unretained card 31 out by reason of its engagement with the metal plate 36. According to the evaluation of 19–20 points coupled with an unbalanced hand, the instruction 35 indicates that the user should "bid in suit".

After the instruction is read by the user, the door 13a is closed and the card 31 is reinserted into the deck 32 through the elongated opening 37.

Operation of the sections 12b and 12c is identical with the exception that each includes three sub-information fields and three pegs 42 must be inserted appropriately based on pertinent information developed during the bidding procedure.

I claim:

1. A bridge bidding indicator comprising:

a housing having an opening and a closure member therefor movable between open and closed positions;

a plurality of magnetically attractable bidding instruction cards capable of being arranged in deck fashion for placement in the housing and removable through said housing opening;

each bidding instruction card having an information field representative of a bridge hand of particular evaluation and a bridge bidding instruction corresponding to said particular evaluation, the information field for each card defined by a plurality of apertures formed through the card, the apertures of each card being disposed for registration with the apertures of all other cards, each card having a slot formed between one of its edges and a different aperture to uniquely represent said particular bridge hand evaluation;

said housing having an information field selectively indicative of different bridge hand evaluations and defined by a like number of apertures formed in registration with the apertures of the instruction cards;

probe means for insertion into a selected registering aperture group and for permitting removal only of the instruction card having the selective aperture slotted;

and magnet means carried by the closure member for engagement with the instruction cards when the closure member is in its closed position, and for removing the selected instruction card upon movement of the closure member to its open position.

2. The bridge bidding indicator defined by claim 1, wherein the magnet means comprises a magnet pivotally mounted on the inner face of the closure member to insure proper contact with the selected instruction card for all movement of the closure member.

3. The bridge bidding indicator defined by claim 1, wherein the housing is divided into a "bid" section, or "answer" section and a "rebid" section, each section having an opening therein and a movable closure member therefor, a separate card instruction deck with appropriate information fields and instructions, a separate information field selectively indicative of different bridge hand valuations, separate probe means, and separate magnet means carried by the associated closure member for removing a selected instruction card.

4. The bridge bidding indicator defined by claim 1, wherein the housing comprises an open-sided box with a hinged closure member therefor.

5. The bridge bidding indicator defined by claim 1, wherein each instruction card is formed from non-magnetic material and further comprises a magnetically attractable plate secured thereto for engagement by the magnet means.

6. The bridge bidding indicator defined by claim 5, wherein the apertures for each instruction card are arranged in alignment along one card edge, and the magnetically attractable plate is disposed along the opposed card edge.

7. The bridge bidding indicator defined by claim 1, wherein the respective information fields of the instruction cards and the housing are divided into a plurality of corresponding sub-information fields, each instruction card having a slotted aperture for each sub-information field.

8. The bridge bidding indicator defined by claim 7, wherein the probe means comprises a peg for each sub-information field.

* * * * *